United States Patent [19]

Krohn

[11] 4,277,271
[45] Jul. 7, 1981

[54] METHOD OF MANUFACTURING GRADED INDEX OPTICAL FIBERS

[75] Inventor: David A. Krohn, Hamden, Conn.

[73] Assignee: Eotec Corporation, West Haven, Conn.

[21] Appl. No.: 53,765

[22] Filed: Jul. 2, 1979

Related U.S. Application Data

[63] Continuation-in-part of Ser. No. 898,840, Apr. 12, 1978, abandoned.

[51] Int. Cl.³ .............................................. C03C 25/02
[52] U.S. Cl. ........................................ 65/3 A; 65/13; 264/1.1; 350/96.31; 427/163
[58] Field of Search ..................... 65/3 A, 13; 264/1; 427/163; 350/96.31

[56] References Cited

U.S. PATENT DOCUMENTS 4,039,607  8/1977  Miller ................................ 65/3 A X

FOREIGN PATENT DOCUMENTS 2637937  3/1978  Fed. Rep. of Germany ............ 65/3 A
2746418  5/1978  Fed. Rep. of Germany ............ 65/3 A
1340849  6/1976  United Kingdom ...................... 65/3 A Primary Examiner—Robert L. Lindsay, Jr.
Attorney, Agent, or Firm—Darby & Darby

[57] ABSTRACT

A process is disclosed for making an optical fiber having a graded index glass core enveloped by a cladding material. The ingredients from which the core glass is to be formed are dropped into a closed tube of the cladding material which is more refractory than the core glass. The ingredients are melted to form a glassy liquid which is fined within the tube. Fining takes place at a temperature sufficiently high to cause a relatively fast reaction between the core glass and cladding, resulting in a partial mixing of the cladding and core glasses. The mixed glasses have an index of refraction intermediate that of the core and cladding at the interface. The temperature is then elevated further and the tube and glassy liquid drawn into a fiber.

10 Claims, 2 Drawing Figures

METHOD OF MANUFACTURING GRADED INDEX OPTICAL FIBERS

BACKGROUND OF THE INVENTION

This is a continuation-in-part of U.S. patent application Ser. No. 898,840 filed Apr. 21, 1978, and entitled "Method of Manufacturing Optical Fibers" now abandoned.

This invention relates to optical fibers and, more particularly, to a method of manufacturing low loss optical fibers having a core in which the index of refraction increases towards the center.

Optical fibers (or optical waveguides as they are sometimes called) should have minimum transmission losses and, in many applications, the ability to gather or accept light from the widest possible angle. These properties enable the maximum transfer of energy by the fiber from a light source to an output device.

Known optical fibers comprise a glass core enveloped by a glass cladding layer having an index of refraction ($n_2$) less than the index of refraction of the core material ($n_1$). Simply stated, the difference between these indices causes light rays entering the fiber within a specified angle to be reflected internally and thereby transmitted through the fiber. The "cone" of light which can be accepted by a fiber is known as the angle of acceptance and the sine of this angle is referred to as the numerical aperture (NA) of the fiber. For any fiber:

$$NA = (n_1^2 - n_2^2)^{\frac{1}{2}}$$

The higher the numerical aperture, the greater the ability of the fiber to gather light. For a numerical aperture equal to one, the angle of acceptance is 90° which means that all of the light striking the face of the fiber will be coupled into it.

Increasing the numerical aperture, while enhancing light gathering efficiency, introduces problems of dispersion because rays entering at grazing angles will travel longer paths than rays which are perpendicular to the face of the fiber. This means that different parts of a light pulse (for example) will traverse the fiber with different traversal times. As a result, the light pulse at the fiber output will be dispersed or broadened and this limits the data carrying capcity of the fiber.

To overcome this problem, the refractive index of the core may be graded so that it increases (e.g., parabolically) from the circumference to the center of the core. This will cause the light to travel a sinusoidal path, with the speed of the light increasing toward the periphery where the index is lower. Hence, light traveling the longer peripheral paths will travel at higher speeds thereby compensating for the added distance and decreasing the dispersion of the input pulse.

The extent to which grading enhances bandwidth (data carrying capcity) has been documented in the literature. Optimum grading can increase bandwidth (compared to a "stepped" fiber) by a factor of about 1,000. Small variations from the optimum result in large decreases in bandwidth, but an increase in bandwidth by a factor of 2 or more is significant and this can be achieved by a relatively slight amount of grading.

The causes for loss in a fiber are material absorption, material scattering, cladding loss and geometry loss. Material absorption losses occur because of transition metal ions and OH groups in the glass that absorb light [e.g. 1 part per million iron will result in a loss of 100 db per km at 800 nm (nanometers)]. Material scattering is due to imperfections in the fiber core, primarily bubbles, microcracks and debris. Cladding loss exists because of imperfections at the core-cladding interface. Geometry loss is due to bends in the fiber and is an inverse function of numerical aperture. An intermediate loss fiber should have losses no greater than 150 db per km and a low loss fiber should have losses no greater than 20 db per km.

Typically, the cladding material of an optical fiber is fused silica ($SiO_2$) of high purity although other glasses such as borosilicates are also used. The core may be a silica glass to which modifiers are added to increase the index of refraction (and the numerical aperture). Suitable modifiers for this purpose include lead oxide (PbO), barium oxide (BaO) and germanium dioxide ($GeO_2$). These modifiers, in turn, may cause problems of glass stability, and agents such as calcium, zinc, or alumina may be added as stabilizing agents. To facilitate melting of the glass (for drawing), fluxing agents such as the oxides of the alkali metals (potassium, sodium and lithium) may also be added.

The introduction of these various agents or components into the core glass creates problems insofar as contamination and, therefore, material absorption losses are concerned. The various components themselves may be sources of contamination but, equally important, the procedure by which a multi-component glass is made can add contaminants which cause substantial material absorption losses.

THE PRIOR ART

Various techniques are used to make optical fibers. In the simplest procedure, a rod of core material is placed within a tube of cladding material, the temperature raised, and the rod and tube drawn to the desired cross-sectional area (see U.S. Pat. No. 3,659,915). Fibers manufactured by this process cannot be used in some cases (e.g. for communications) because of excessive losses and dispersion.

The most important processes for making low loss fiber optics are known as the double crucible process, the chemical vapor deposition process and the ion leaching process.

In the double crucible process a platinum or ceramic outer crucible contains the cladding glass. Inside the outer crucible is another platinum or ceramic crucible in which the core glass is melted. A fiber is drawn by pulling the core glass inside of the cladding glass. The process is capable of producing glasses with moderate numerical aperture; however, it is basically for making moderate loss fibers because of geometric inconsistencies associated with drawing glasses which are in a very fluid state and also because the ceramic or platinum crucibles cause contamination of the glass materials. However, with careful selection of the core glass composition it is possible to make low loss fibers.

In the chemical vapor deposition process, pure chemicals (for example, silica tetrachloride, germanium tetrachloride and boron chloride) are passed into a manifold with oxygen. They are then mixed and fed into a rotating high purity fused silica tube in which flame traverses the tube while it is rotating. The result is that the silica is oxidized and deposited on the inside of the high purity fused silica tube. The deposit is doped with germanium dioxide and the tube is then collapsed and drawn. The composition can be readily controlled and it is possible to get good gradients in composition and therefore good gradients in refractive index. The process has associated with it limited pre-form size, which inhibits large scale production, and core defects may arise when the tube is collapsed.

In the ion leaching process, a borosilicate glass rod is heat treated. During the heat treatment the glass phase separates and the impurities migrate to the second phase. The glass is then acid leached and the second phase along with the impurities removed from the core glass yielding a high purity microporous silica glass. A high purity dopant (for example, cesium) is introduced and the surface washed so that the surface is dopant free while the interior still contains the dopant. Then the micro-pores are collapsed at high temperature to form a preform and the fiber is drawn. This process yields low or moderate numerical aperture and moderate loss although the process may be able to yield low loss. Grading the fiber by this process would be difficult. Also, there are many steps involved and in many of the early steps the preform is unstable due to mechanical weakness so that yield can be a problem.

British Patent No. 1,340,849 (Uffen) discloses a process for manufacturing optical fibers wherein a tube of cladding material serves as a crucible in which the core glass is melted. The batch for the core glass is premixed and introduced into the tube in a powder form, with particle sizes chosen "so that when a fine rain of the powder mixture falls on the surface of the hot melt volatile products may be uninteruptedly evolved . . . ". This reduces the fining period. Uffen states that the surface of the melt and the falling particles may be heated by auxiliary heating means to assist "in the provision of appropriate conditions" (page 2, lines 28–32).

Although the Uffen process includes the basic advantage of retaining purity (enhancing efficiency) no technique is disclosed for grading the index of refraction, and conventional techniques for grading optical fibers could not be employed in conjunction with the Uffen process.

OBJECT OF THE INVENTION

An object of this invention is to provide a continuous process for making low loss optical fibers wherein numerical aperture can be closely controlled, if desired, and wherein the refractive index is graded so as to minimize dispersion.

SUMMARY OF THE INVENTION

Figure 1:
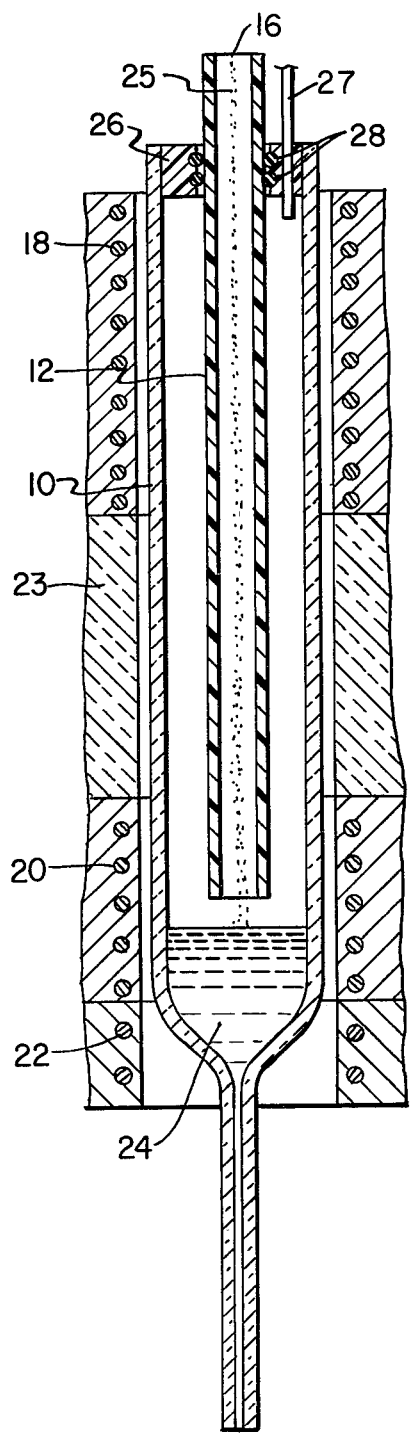
FIG. 1 shows diagrammatically the apparatus and materials used to practice the invention.

In accordance with the invention, the material from which the core glass is to be made is inserted into a closed tube made of the cladding material and melted to form a glassy liquid within the tube. The core glass includes a composition such as barium oxide or lead oxide which is capable of reacting uniformly with the cladding material at high reaction temperatures. The glassy liquid formed at the bottom of the cladding tube is raised to this reaction temperature and the temperature maintained until a portion of the cladding material has been mixed with the glassy liquid. The tube and core glass are then elevated to drawing temperature and drawn into the optical fiber. Because of the reaction between the core glass and the cladding material, the index of refraction is graded across the interface between the two.

DETAILED DESCRIPTION

In describing the invention, reference will be made to the use of a batch material for forming a multi-component core glass; however, as explained below, the process of the invention may start with a pure cullet.

As used herein, the term "batch material" means an ingredient used to form glass. In most cases these ingredients (or glass components) are oxides which are mechanically mixed and melted. Upon cooling, the glass is formed. Commonly, these ingredients are referred to as glass formers, glass modifiers and fluxes. In some cases, a batch material may be pre-reacted, for example, by heating to facilitate outgassing. Glass may include one or several of these components depending on the properties desired. In the case of optical fibers, the principal properties of concern (besides purity) are index of refraction, viscosity, thermal expansion and stability.

According to the invention, a tube 10 made of the cladding material is closed at its lower end. A commercially available, high purity, fused silica tube may be used as tube 10. A second tube 12, which also may be silica, is inserted into the tube 10 with the bottom of tube 12 slightly above the closed end of tube 10 for reasons explained below. The interior tube 12 includes an opening 16 through which the batch material for the core glass can be introduced.

Three heating elements 18, 20 and 22 envelope the tube 10. Although any suitable heating means may be used, the heaters may comprise graphite resistance heating devices enveloping tube 10 with insulation 23 separating elements 18 and 20. The upper heater 18 provides a conditioning zone in which the batch material may be heated prior to melting or actually melted as described in further detail below. The heater 20 provides a higher temperature melting zone in which, according to the invention, the cladding material and core glass react. The lowermost heater 22 is capable of raising the temperature of the glass to drawing temperatures so that the fiber can be drawn.

The batch material can (and should) be of high purity and substantially less refractory than the tube 10 so that tube 10 can serve as a crucible in which the batch material can be melted. In the drawing the batch material is represented by the particles 25.

In accordance with the invention, the core glass includes a refractive index raiser, such as a heavy metal oxide of barium, lead or tungsten (among others), which is capable of reacting uniformly with the silica cladding at high temperatures. The core glass must be capable of reacting (mixing) uniformly with the silica cladding or else discontinuities may form which will reflect light and therefore reduce efficiency. The batch material is introduced through opening 16 in the form of premixed powder and falls through the inner tube 12 to the bottom of the cladding tube 10 where it ultimately forms a glassy liquid 24. A seal 26 (e.g. a heat resistant Teflon ring) is provided between the inner tube 12 and the cladding material 10 at the top of the tube 10. A partial vacuum (e.g. 10 mm of Hg) is applied to a port 27 between tubes 10 and 12 to draw off effluent gasses formed as the batch material is conditioned and subsequently melted. Th prompt outgassing of these undesired effluents is important in a continuous process since it avoids the production of fine bubbles ("seed") which may require prolonged fining. (See page 2, lines 28–33 of British Patent No. 1,340,849). A pair of O-rings 28 (which also may be made of Teflon) provide a movable seal enabling the partial vacuum to be maintained as the glass tube 10 is lowered during drawing of the fiber.

Ordinarily, a multicomponent core glass will melt at a temperature of less than 1,200° C. Furthermore, in the past, it has been considered desirable to maintain the lowest possible melting temperature since lower temperatures are easier to control and there is less likelihood of crucible attack. It is also more difficult, and therefore expensive, to reach and maintain higher temperatures, for example in excess of 1,700° C.

In accordance with the invention, however, a melting temperature is used which is substantially in excess of the temperature at which the batch materials for the core glass will melt. For example, if the index modifier includes barium oxide (BaO), melting temperatures in the range of 1750° to 1900° C. are preferred. At this temperature, a reaction occurs between the liquid core glass and the cladding material of the tube 10 whereby a portion of the cladding material is mixed with the glassy liquid 24. This reaction or mixing of the glasses results in an index of refraction across the interface between the two materials which is intermediate the indices of the unmixed core and cladding materials. The value of the index will depend on the degree of mixing thereby grading the index of refraction as desired.

The extent of the reaction is also dependent upon the time at which the temperature is maintained. Preferably, the reaction time should be less than one hour. This will enable continuous drawing of the fiber at a rate of about one meter per second or faster. Of course, as the fiber is being drawn, the batch material must be continuously replenished through the opening 16.

The inner tube 12 prevents splattering of the melted glass against the inner wall of the cladding tube 10. The position of the tube 12 relative to the glassy liquid 24 should remain the same. Thus, if the tube 12 is maintained stationary, the other tube 10 (and seal 26) must be moved downwardly as the fiber is drawn. Preferably, the bottom of the tube 12 should be about 10 mm above the surface of the glassy liquid 24. If it is too high, batch particles may be sucked out by the vacuum; if too close, the melt may freeze and plug the bottom of the tube 12.

Typically, the glass melt 24 may be about 30 mm deep. If too much liquid is allowed to accumulate, a crust may form which will prevent outgassing and possibly cause tube 10 to rupture. If there is an inadequate supply of the glassy liquid 24, the liquid may be consumed totally during a rapid drawing process.

Various different core glasses have been used to make optical fibers in accordance with the invention. Examples of successfully used core glass compositions are given below, with percentages specified by weight. In the following examples, a high-purity fused silica outer tube 10 having an inner diameter of 19 mm and an outer diameter of 25 mm was used. Tube 12 was also fused silica with an inner diameter of 7 mm and an outer diameter of 10 mm. Fused silica is one of the purest materials available in terms of transition metal ions (primarily iron, copper and cobalt). For commercial purposes, a larger diameter tube will be preferable since the quality of the fiber improves as the ratio of the "crucible" volume to its surface area increases. Moreover, there are important production advantages for a longer draw.

In the following examples, the batch material was heated to a temperature of about 1200° C. in the top zone. The glassy liquid 24 was maintained at a temperature of about 1750°–1900° C. for about one hour with the surface of the melt maintained at a temperature about 100° C. lower to avoid so-called metal line cut at the surface of the melt. About 1 mm of the tube 10 was at least partially mixed with the core glass. The fiber was drawn at a rate of about 0.5 M/sec. at a temperature of about 1950° C.

| Example 1 | |
|---|---|
| $SiO_2$ | 27% |
| BaO | 18% |
| $Na_2O$ | 25% |
| $B_2O_3$ | 29% |
| $As_2O_3$ | 1% |
| Example 2 | |
| $SiO_2$ | 42% |
| BaO | 15% |
| $Na_2$ | 22% |
| $B_2O_3$ | 20% |
| $As_2O_3$ | 1% |
| Example 3 | |
| $SiO_2$ | 37% |
| BaO | 5% |
| $Na_2O_3$ | 22% |
| $B_2O_3$ | 35% |
| $As_2O_3$ | 1% |
| Example 4 | |
| $SiO_2$ | 27% |
| BaO | 15% |
| $Na_2O_3$ | 22% |
| $B_2O_3$ | 35% |
| $As_2O_3$ | 1% |
| Example 5 | |
| $SiO_2$ | 42% |
| BaO | 5% |
| $Na_2O_3$ | 22% |
| $B_2O_3$ | 30% |
| $As_2O_3$ | 1% |
| Example 6 | |
| $SiO_2$ | 42% |
| BaO | 10% |
| $Na_2O_3$ | 22% |
| $B_2O_3$ | 25% |
| $As_2O_3$ | 1% |

Figure 2:
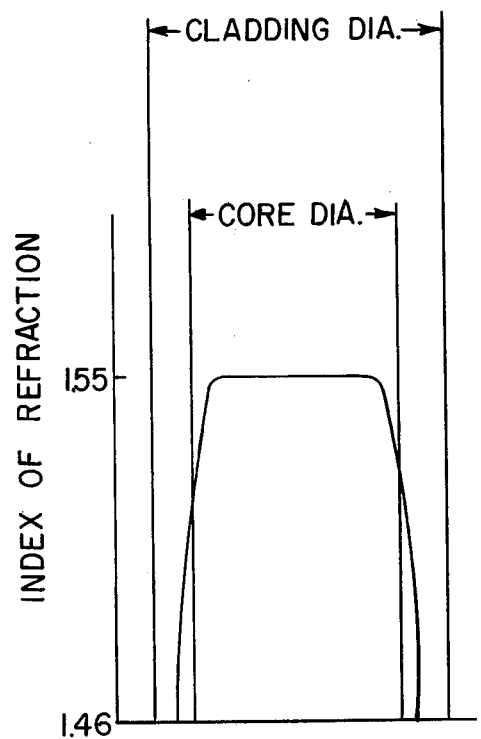
FIG. 2 represents an estimated profile of the graded index of refraction of a fiber made in accordance with the invention.

An estimated index profile for the above compositions is shown in FIG. 2. The grading profile index ( ) for this profile is calculated to be 3.13 which would correspond to a bandwidth five times that of a stepped fiber.

Instead of forming the core glass from batch material 12 within tube 10, previously melted ultra-pure glass which is in powder or granular form (hereinafter referred to as "cullet") may be used as a raw material. To obtain a highly purified cullet suitable for use in manufacturing a low loss fiber, the glassy liquid 24 within tube 10 may be quenched in ultra-pure deionized water (for example). This will cause the glass to solidify in the form of a granular or powder-like cullet. The cullet may then be stored (under ultra-clean conditions) until it is to be used, at which time the cullet is melted and fined within a tube 10 as described. The advantage in using a cullet is that the two melting steps may provide better outgassing, thus yielding less bubbles and better homogeneity.

Other techniques may also be used to provide a suitable cullet. For example, in a "skull" melting technique, a "skull" of pure glass is first coated on a container. The pure glassy liquid from which the cullet is to be formed is then melted in the skull and the cullet formed by quenching the glassy liquid.

In accordance with a further feature of the invention, the batch materials may actually be melted to form glass as they are falling through the inner tube 12. For this purpose, the conditioning zone 18 should provide a temperature above 1600° C. This provides an important advantage in reducing the melting time, and facilitating the outgassing of effluent bubbles which form during the glass melting process.

What is claimed is:

1. A process for making graded optical fibers, comprising providing a glass tube made of a cladding material closed at one end and having a first index of refraction;

inserting into said glass tube a material from which a core glass having a second index of refraction higher than said first index is to be formed, said material being capable of reacting with said cladding material above a predetermined temperature substantially higher than the melting temperature of said material;

melting said material to form a glassy liquid at the closed end of said tube;

maintaining the temperature of said glassy liquid at the closed end of said tube;

maintaining the temperature of said glassy liquid above said predetermined temperature until a substantial portion of the inner wall of said tube has mixed with said glassy liquid; and drawing said glassy liquid into said optical fiber comprising a cladding made of said glass tube and a core made of said glassy liquid with an index of refraction in the portion of the fiber which includes the cladding material mixed with the core glass intermediate said first and second indices.

2. A process according to claim 1, wherein said core glass includes barium oxide.

3. A process for making graded optical fibers according to claims 1 or 2, wherein said predetermined temperature is in the range of about 1,750° to 1,900° C.

4. A continuous process for making graded optical fibers according to claims 1 or 2 wherein said glassy liquid is maintained at a temperature in the range of 1,750° to 1,900° C. for a period of about one hour or less.

5. A continuous process for making graded optical fibers, comprising providing a glass tube made of a high purity silica closed at one end and having a first index of refraction;

inserting into said glass tube batch materials from which a core glass having a second index of refraction higher than said first index is to be formed, at least one of said batch materials being capable of reacting with said cladding material above a predetermined temperature substantially higher than the melting temperature of said batch materials;

melting said batch materials to form a glassy liquid at the closed end of said tube;

maintaining the temperature of said glassy liquid above said predetermined temperature until a portion of the inner wall of said tube has mixed with said glassy liquid;

drawing said glassy liquid into said optical fiber comprising a cladding made of said glass tube and a core made of said glassy liquid with an index of refraction in the portion of the fiber which includes the cladding material mixed with the core glass intermediate said first and second indices; and adding a batch material to said tube as said optical fiber is being drawn.

6. A continuous process according to claim 5, wherein said glassy liquid includes silica and barium oxide and wherein said predetermined temperature is in the range of about 1750° C. to 1900° C.

7. A continuous process according to claim 5, wherein an inner tube is inserted into said glass tube to a predetermined height above the surface of said glassy liquid and said batch material is inserted through said inner tube.

8. A continuous process according to claim 7, wherein said steps of melting and maintaining the temperature take place under a partial vacuum.

9. A continuous process according to claim 7, wherein the depth of said glassy liquid is maintained substantially constant by the introduction of batch material.

10. A continuous process according to any of claims 7, 8 or 9 wherein said inner tube is maintained stationary and said glass tube is lowered as the optical fiber is drawn.

* * * * *